United States Patent

Wong et al.

[11] Patent Number: 6,096,124
[45] Date of Patent: Aug. 1, 2000

[54] INK COMPOSITIONS

[75] Inventors: Raymond W. Wong; Shadi L. Malhotra; Marcel P. Breton, all of Mississauga, Canada

[73] Assignee: Xerox Corporation, Stamford, Conn.

[21] Appl. No.: 09/300,193

[22] Filed: Apr. 27, 1999

[51] Int. Cl.[7] .................................................. C09D 11/00
[52] U.S. Cl. .................... 106/31.43; 106/31.29; 106/31.61; 106/31.75; 106/31.57; 106/31.87
[58] Field of Search ............................. 106/31.29, 31.61, 106/31.43, 31.75, 31.57, 31.87

[56] References Cited

U.S. PATENT DOCUMENTS

| | | | |
|---|---|---|---|
| 3,985,663 | 10/1976 | Lu et al. | 252/62.1 L |
| 4,490,731 | 12/1984 | Vaught | 346/140 R |
| 4,751,528 | 6/1988 | Spehrley, Jr. et al. | 346/140 R |
| 4,791,439 | 12/1988 | Guiles | 346/140 R |
| 4,840,674 | 6/1989 | Schwarz | 106/22 |
| 4,853,036 | 8/1989 | Koike et al. | 106/20 |
| 5,006,170 | 4/1991 | Schwarz et al. | 106/20 |
| 5,041,161 | 8/1991 | Cooke et al. | 106/22 |
| 5,098,477 | 3/1992 | Vieira et al. | 106/22 |
| 5,111,220 | 5/1992 | Hadimioglu et al. | 346/140 R |
| 5,121,141 | 6/1992 | Hadimioglu et al. | 346/140 R |
| 5,122,187 | 6/1992 | Schwarz et al. | 106/25 |
| 5,124,718 | 6/1992 | Koike et al. | 346/1.1 |
| 5,371,531 | 12/1994 | Rezanka et al. | 347/43 |
| 5,382,492 | 1/1995 | El-Sayed et al. | 430/115 |
| 5,518,534 | 5/1996 | Pearlstine et al. | 106/20 R |
| 5,531,818 | 7/1996 | Lin et al. | 106/23 C |
| 5,667,568 | 9/1997 | Sacripante et al. | 106/20 R |
| 5,679,115 | 10/1997 | Fritzsche et al. | 8/444 |
| 5,698,017 | 12/1997 | Sacripante et al. | 106/31.49 |
| 5,698,128 | 12/1997 | Sakai et al. | 219/745 |
| 5,700,316 | 12/1997 | Pontes et al. | 106/31.58 |
| 5,725,604 | 3/1998 | Fritzsche et al. | 8/543 |
| 5,759,701 | 6/1998 | Malhotra | 428/500 |

*Primary Examiner*—Mark L. Bell
*Assistant Examiner*—Veronica F. Faison
*Attorney, Agent, or Firm*—E. O. Palazzo

[57] ABSTRACT

A conductive ink composition comprised of (1) an acid salt; (2) a conductive quaternary compound; (3) a viscosity modifying compound; (4) a lightfastness component; (5) a lightfastness antioxidant; and (6) a colorant.

39 Claims, No Drawings

INK COMPOSITIONS

REFERENCE TO COPENDING PATENT APPLICATIONS AND PATENTS

Inks are illustrated in U.S. Pat. Nos. 5,931,995; 5,902,390; 5,876,492 and 5,922,117, U.S. Ser. No. 09/281,571, U.S. Ser. No. 09/281,682; U.S. Ser. No.09/281,540, U.S. Ser. No. 09/304,393, U.S. Ser. No. 09/300,298, U.S. Ser. No. 09/300,331, U.S. Ser. No. 09/300,333, U.S. Ser. No. 09/300,331, and U.S. Ser. No. 09/300,332, the disclosures of each being totally incorporated herein by reference.

The appropriate components and processes of the above copending applications may be selected for the present invention in embodiments thereof.

BACKGROUND OF THE INVENTION

The present invention is directed to ink compositions and, more specifically, the present invention relates to conductive inks, wherein conductive refers, for example, to an ink which has the ability, or quality of transmitting electrical signals. The conductivity of an ink can be measured in terms of the reciprocal of resistivity, which is the capacity for electrical resistance. The conductivity values of inks expressed as log(pico.mho/cm) and recited herein were measured under melt conditions at about 150° C. by placing an aluminum electrode in the molten ink and reading the resistivity output on a GenRad 1689 precision RLC Digibridge at a frequency of 1 K.Hz. Conductivity expressed in terms of [log(pico.mho/cm)] and calculated from the reciprocal of resistivity. Generally, the inks of the present invention can possess high conductivity values in the range of from about 5 to about 8.5 log(picomho/cm), preferably from about 6.0 to about 8.5, and more preferably from about 6 to about 7.5 log(picomho/cm), and which inks possess for example a melting point of from about 60° C. and about 150° C., and preferably from about 70° C. to about 90° C. (degrees Centigrade throughout). The inks of the present invention are preferably selected for electric field assisted acoustic inkjet printing processes and apparatuses, reference, for example, U.S. Pat. No. 5,121,141, U.S. Pat. No. 5,111,220, U.S. Pat. No. 5,371,531, the disclosures of which are totally incorporated herein by reference, including particularly acoustic ink processes as illustrated in some of the above copending applications and patents, such as an acoustic ink printer for printing images on a record medium. In acoustic ink printing, the printhead generates approximately 2.2 picoliter droplets by an acoustic energy process. The ink under these conditions should preferably display a melt viscosity of about 5 to about 10 centipoise or less at the jetting temperature. Furthermore, once the ink is jetted onto the paper, the ink image should be of excellent crease property, and should be nonsmearing, waterfast, of excellent transparency and excellent fix qualities. In selecting an ink for such applications, it is desirable that the vehicle display a low melt viscosity, such as from about 1 centipoise to about 25 centipoise in the acoustic head, while also displaying solid like properties after being jetted onto paper. Since the acoustic head can usually tolerate a temperature up to, for example, about 180° C., and preferably up to a temperature of from about 140° C. to about 160° C., the vehicle for the ink should preferably display liquid like properties, such as a viscosity of 1 to about 10 centipoise at a temperature of from about 75° C. to about 165° C., and solidify or harden after jetting onto paper such that the ink displays a hardness value of from about 0.1 to about 0.5 millimeter utilizing a penetrometer according to the ASTM penetration method D1321.

PRIOR ART

The use of quaternary ammonium compounds in nonpolar liquid electrostatic developers is disclosed in U.S. Pat. No. 3,985,663, which illustrates conductive inks containing quaternary ammonium compounds, and more specifically ink compositions comprised of a coloring agent, a binder, a dispersing agent, a carrier and a quaternary ammonium compound soluble in the liquid carrier. U.S. Pat. No. 5,382,492 discloses quaternary ammonium compounds as charge adjuvants for positive electrostatic liquid developers, and which developers can contain (A) a nonpolar liquid having a Kauri-butanol value of less than 30; (B) thermoplastic resin particles having dispersed therein a quaternary ammonium compound which is substantially insoluble in the nonpolar liquid; and (C) a nonpolar liquid soluble ionic or zwitterionic charge director compound. Polar water containing inks with mineral acid salts or organic acid salts are illustrated in U.S. Pat. No. 5,518,534, which patent discloses an ink set and process for alleviating bleed in printed elements employing a first ink and a second ink, each containing an aqueous carrier medium and a colorant; the colorant in the first ink being a pigment dispersion and the second ink containing a salt of an organic acid or mineral acid having a solubility of at least 10 parts in 100 parts of water at 25° C. U.S. Pat. No. 5,531,818 discloses a thermal ink jet printing process which comprises: (a) incorporating into a thermal ink jet printer an ink composition comprising water, a dye, and pigment particles, and chemically bonded to the surfaces of the pigment thereof a hydrophilic moiety selected from the group consisting of sulfonic acid salts, phosphoric acid salts, carboxylic acid salts, and mixtures thereof; and (b) causing droplets of the ink to be ejected in an imagewise pattern onto a recording medium by selectively heating the ink in the printer in an imagewise pattern, thereby generating images on the recording medium.

Ink jet-printing processes that use inks that are solid at room temperature and liquid at elevated temperatures are known. For example, U.S. Pat. No. 4,490,731, the disclosure of which is totally incorporated herein by reference, discloses an apparatus for dispensing certain solid inks for printing on a substrate such as paper. The ink dye vehicle selected preferably possesses a melting point above room temperature so that the ink, which is melted in the apparatus, will not be subject to evaporation or spillage during periods of nonprinting, and the ink vehicle selected possesses a low critical temperature. In thermal ink jet printing processes employing phase-change inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby attempting to enable higher print density than is generally obtained with liquid inks. Phase-change ink jets are somewhat similar to thermal ink jets; however, a phase-change ink usually contains no solvent. Thus, rather than being liquid at room temperature, a phase-change ink is typically a solid with a wax-like consistency. These inks usually need to be heated, for example, to approximately 100° C. before the ink melts and turns into a liquid. With phase-change inks, a plurality of ink jet nozzles is provided in a printhead. A piezoelectric vibrating element is located in each ink channel upstream from a nozzle so that the piezoelectric oscillations propel ink through the nozzle. After the phase-change ink is applied to the substrate, freezing on the substrate resolidifies the ink.

Each of these types of known ink jets, however, has a number of advantages and disadvantages. One advantage of thermal ink jets is their compact design for the integrated electronics section of the printhead. Thermal ink jets are disadvantageous in that the thermal ink has a tendency to soak into a plain paper medium. This blurs the print or thins out the print, locally thereby adversely affecting print quality. Problems have been encountered with thermal ink jets in attempting to rid the ink of moisture fast enough so that the ink does not soak into a plain paper medium. This is particularly true when printing with color. Therefore, usually when printing with a thermal ink, coated papers are used, and which coated papers are more expensive than plain paper.

One advantage of phase-change ink is its ability to print on plain paper since the phase-change ink quickly solidifies as it cools and, since it is waxy in nature, it does not normally soak into a paper medium. However, phase-change inkjet systems can be cumbersome in structure and in design. That is, the associated integrated electronics of a thermal ink jet head are considerably more compact than those of a phase-change ink jet head.

U.S. Pat. No. 4,751,528, the disclosure of which is totally incorporated herein by reference, discloses a phase-change ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify phase-change ink in a selected zone more rapidly to avoid offset by a pinch roll coming into contact with the surface of the substrate to which phase-change ink has been applied. An airtight enclosure surrounding the platen can be connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with phase-change inks with an integrally connected ink jet head and reservoir system, the reservoir system including a highly efficient heat conducting plate.

Ink compositions for ink jet printing are known. For example, U.S. Pat. No. 4,840,674, the disclosure of which is totally incorporated herein by reference, discloses an ink composition which comprises a major amount of water, an organic solvent selected, for example, from the group consisting of tetramethylene sulfone, 1,1,3,3-tetramethyl urea, 3-methyl sulfolane, and 1,3-dimethyl-2-imidazolidone, and which solvent has permanently dissolved therein spirit soluble dyes.

U.S. Pat. No. 5,006,170 and U.S. Pat. No. 5,122,187, the disclosures of each of which are totally incorporated herein by reference, disclose ink compositions suitable for ink jet printing which comprise a colorant, a binder, and a propellant such as hydrazine, cyclic amines, ureas, carboxylic acids, sulfonic acids, aldehydes, ketones, hydrocarbons, esters, phenols, amides, imides, halocarbons, and the like.

U.S. Pat. No. 5,041,161, the disclosure of which is totally incorporated herein by reference, discloses a phase-change ink comprised, for example, of ink vehicles, such as acids, aldehydes and mixtures thereof.

U.S. Pat. No. 4,853,036 and U.S. Pat. No. 5,124,718 disclose an ink comprised of a liquid composition with a coloring matter, a volatile solvent with a vapor pressure of 1 millimeter Hg or more at 25° C., and a compound being solid at room temperature and having a molecular weight of 300 or more.

U.S. Pat. No. 5,667,568 discloses an ink composition comprised of a colorant and a bisamide with, for example, a viscosity of from about 1 centipoise to about 20 centipoise at a temperature of from about 125° C. to about 185° C.

U.S. Pat. No. 5,698,017 discloses an ink composition comprised of a colorant and a vehicle component, and which vehicle component is comprised of the condensation product of an organic acid and an amino alcohol.

U.S. Pat. No. 5,698,128 discloses an ink composition comprised of a colorant and a reversible crosslinked component vehicle obtained from the reaction product of an anhydride and an organoamine, and which ink possesses a viscosity of, for example, from about 1 centipoise to about 25 centipoise at a temperature of from about 125° C. to about 185° C.

U.S. Pat. No. 5,700,316 discloses an ink composition comprised of a colorant and a vehicle of a poly(alkylene oxide)-alkylate, a poly (alkylene oxide)-dialkylate, a polyoxa-alkanoate ester, or a polyoxa-alkanedioate diester, and which ink possesses a viscosity of from about 1 centipoise to about 15 centipoise at a temperature of from about 125° C. to about 165° C.

The inks of U.S. Pat. No. 5,667,568, containing blends of N'-dodecylbis-stearamide, 95 percent by weight and a colorant 5 percent by weight, and the inks of U.S. Pat. No. 5,698,128 derived from blends of the reaction product of an anhydride and an organoamine, 95 percent by weight and a colorant 5 percent by weight generally possess viscosities in the range of from about 10 to about 15 centipoise and these inks possess, it is believed, low conductivity values in the range of about 3.5 to about 4.5 log(picomho/cm) compared to preferred viscosities of about 5 to 5.5 centipoise and preferred conductivity values of 6.5 [log pico.mho/cm], which conductivity throughout is usually measured at room temperature of about 25° C. for the inks of the present invention in embodiments. Advantages of the low viscosity and high conductivity inks of the present invention resides in reduced power consumption by about 35 percent, thereby increasing the printing speed from about 25 pages per minute to about 40 pages per minute; improved jettability which refers to the drop size of the ink being uniform across the print head, thus permitting better ink directionality, that is the velocity of the ink drops; and has a standard deviation value of between about 3 to 5 microns, and consequently, there results lower edge raggedness of the prints, such as a value of about 5 microns and preferably equal to about, lower than about 3 microns. The edge raggedness, which can be measured with an optical microscope, is the deviation of the average width of a line measured from the middle of the line to the edge of the line [also known as mid-frequency line-edge noise (MFLN)].

The disclosures of each of the patents recited herein are totally incorporated herein by reference.

SUMMARY OF THE INVENTION

While the known ink compositions and processes may be suitable for their intended purposes, a need remains for acoustic phase-change conductive ink compositions suitable for electric field assisted ink jet printing. In addition, there is a need for phase-change ink compositions, which are compatible with a wide variety of plain papers and yield photographic quality images on plain and coated papers. Further, there is a need for conductive phase-change ink compositions, which generate high quality, lightfast, and waterfast images on plain papers. There is also a need for conductive phase-change ink jet ink compositions which generate high quality, fast-drying images on a wide variety of plain paper at low cost with high-quality text and high-quality graphics, and wherein the dye is retained on the paper surface, while the ink vehicle can continue to spread within the paper structure. Further, there is a need for conductive phase-change ink jet ink compositions, which exhibit minimal or no feathering. Additionally, there is a need for phase-change ink jet ink compositions, which exhibit minimal intercolor bleed, and which inks also exhibit excellent image permanence. Additionally, there is a need for phase-change hot ink compositions suitable for ink jet printing processes wherein the substrate is heated prior to printing and is cooled to ambient temperature subsequent to printing (also known as heat and delay printing processes). There is also a need for ink compositions suitable for ink jet printing wherein high optical densities can be achieved with relatively low dye concentrations. A need also remains for ink compositions suitable for ink jet printing wherein curling of the substrate, such as paper, subsequent to printing is minimized, or avoided. Another need resides in providing phase-change inks wherein the spherulite (spherical ink crystals) size during solidification can be reduced from the conventional 6 to 9 micrometers to about 2 to about 4 micrometers, and in certain situations, reduced to about 1 to about 3 micrometers by crystallinity inhibitor diluents derived from low viscosity thiophene compounds, to thereby improve projection efficiency and crease resistance. These and other needs can be achievable with the inks of the present invention in embodiments thereof.

DETAILED DESCRIPTION OF THE INVENTION

Aspects of the present invention relate to an ink, preferably a nonaqueous conductive ink composition comprised of (1) an acid salt; (2) a conductive quaternary compound; (3) a viscosity compound, which primarily functions to control and/or modify or change the ink viscosity; (4) a lightfastness component; (5) a lightfastness antioxidant; and (6) a colorant; an ink containing an acid salt that possesses a melting point of from about 60° C. to about 120° C., a conductive quaternary compound possessing a melting point of from about 80° C. to about 120° C., a viscosity modifying compound of a thiophene, and a UV absorber lightfastness component, an ink wherein (1) the acid salt possesses an acoustic-loss value of from about 25 to about 80 dB/mm; (2) the quaternary compound possesses an acoustic-loss value of from about 15 to about 60 dB/mm; and (3) the thiophene compound possesses an acoustic-loss value of from about 5 to about 40 dB/mm, and the ink possesses an acoustic-loss value of from about 10 to about 80 dB/mm, a viscosity of from about 1 centipoise to about 15 centipoise, and a conductivity of from about 6 to about 9, and preferably to about 8 [log(pico.mho/cm)] at a room temperature of from about 20° C. to about 40° C.; an ink which ink yields images with crease values of from about 5 to about 10, haze values of from about 10 to about 15, and gloss values of from about 85 to about 90, and which ink possesses an acoustic-loss value of from about 10 to about 80 dB/mm, and a viscosity of from about 1 centipoise to about 10 centipoise, and a conductivity of from about 6 to about 7.5 [log(pico.mho/cm)] at a temperature of from about 125° C. to about 165° C.; an ink wherein the acid salt is present in an amount of from about 1 to about 59 percent by weight, the quaternary compound is present in an amount of from about 39 to about 0.5 percent by weight, the thiophene compound is present in an amount of from about 59 to about 0.5 percent by weight, the lightfastness UV absorber is present in an amount of from about 0.25 to about 10 percent by weight, the antioxidant is present in an amount of from about 0.25 to about 10 percent by weight, and the colorant is present in an amount of from about 0.5 to about 20 percent by weight, and wherein the total of all of the ink components is about 100 percent; an ink composition wherein the salt is selected from the group consisting of (1) diethyldithiocarbamic acid ammonium salt; (2) diethyldithiocarbamic acid diethylammonium salt; (3) L-alanine ethyl ester hydrochloride; (4) DL-alanine ethyl ester hydrochloride; (5) ethyl 4-aminobutyrate hydrochloride; (6) 2-ethyl-2-thiopseudourea hydrobromide; (7) formamidine hydrochloride; and (8) N-methylhydroxylamine hydrochloride, with the preferred salts being diethyidithiocarbamic acid ammonium salt, (2)diethyldithiocarbamic acid diethylammonium salt, and (3) L-alanine ethyl ester hydrochloride; an ink wherein the quaternary compound is selected from the group consisting of (1) azidotris (diethylamino) phosphonium bromide; (2) cetylpyridinium chloride monohydrate; (3) trimethylsulfonium methyl sulfate; (4) tetrakis(decyl) ammonium bromide; (5) tetraheptyl ammonium bromide; (6) tetrabutyl phosphonium chloride; (7) 3-ethyl-5-(2-hydroxyethyl)-4-methylthiazolium bromide; (8) (-)-N-dodecyl-N-methylepherdinium bromide; (9) 3,4-dimethyl-5-(2-hydroxyethyl)thiazolium iodide; (10) dodecyltriphenylphosphonium bromide; (11 tetraoctylammonium bromide; (12) 1 ,3-didecyl-2-2-methylimidazolium chloride; and (13) 1-ethyl-3-methyl-1-H-imidazolium chloride, with the preferred quaternary compounds being dodecyltriphenyl phosphonium bromide; 1,3-didecyl-2-2-methylimidazolium chloride; 1-ethyl-3-methyl-1-H-imidazolium chloride; and cetylpyridinium chloride monohydrate; an ink wherein the thiophene is selected from the group consisting of (1) 3-acetyl thiophene; (2) 2-acetyl-5-bromothiophene; (3) 2-acetyl-5-chlorothiophene; (4) 3-acetyl-2,5-dichloro thiophene; (5) tetrabromo thiophene; (6) 2-thiopheneacrylic acid; (7) 2-thiophene acetic acid; (8) 3-thiopheneacetic acid; (9) 2-thiophenecarboxylic acid; (10) 3-thiophenecarboxylic acid; (11) 3-thiophene glyoxylic acid; (12) 3-thiophene malonic acid; (13) 2-thiophenecarboxylic hydrazide; (14) 2,3-thiophene dicarboxaldehyde; (15) 2,5-thiophene dicarboxaldehyde; (16) terthiophene; (17) 2-nitrothiophene; (18) 5-nitro-2-thiophene carboxaldehyde; (19) trans-2-(2-nitrovinyl) thiophene; and (20) 3-benzoylthiophene, with the preferred thiophenes being terthiophene; and tetrabromo thiophene and 3-thiophene glyoxylic acid; a nonaqueous conductive ink composition wherein the lightfastness UV absorber is selected from the group consisting of (1) 1,1-(1,2-ethanediyl)bis(3,3,5,5-tetramethyl piperazinone); (2) 2,2,4-trimethyl-1,2-hydro quinoline; (3) 2-(4-benzoyl-3-hydroxyphenoxy)ethylacrylate; (4) 2-dodecyl-N-(1,2,2,6,6-pentamethyl-4-piperidinyl)succinimide; and (5) 2,2,6,6-tetramethyl-4-piperidinylβ,β,β',β'-tetramethyl-3,9-(2,4,8, 10-tetraoxospiro(5,5)-undecane) diethyl]-1,2,3,4-butane tetracarboxylate; an ink wherein the lightfast antioxidant is selected from the group consisting of (1) antimony dialkyl phosphorodithioate; (2) molybdenum oxysulfide dithio carbamate; (3) (nickel-bis(o-ethyl(3,5-di-tert-butyl-4-hydroxybenzyl)phosphonate; and (4) tetra sodium-N-(1,2-dicarboxyethyl)-N-octadecyl sulfosuccinamate; a printing process which comprises incorporating into an acoustic ink jet printer, and causing droplets of the invention ink to be ejected in imagewise pattern onto a substrate; an acoustic ink jet process wherein the ink selected contains a (1) solid acid salt with a melting point of from about 75° C. to about 100° C. (for example throughout for ranges), and an acoustic loss of from about 25 to about 80 dB/mm; (2) a conductive quaternary compound with a melting point of from about 80° C. to about 100° C. and an acoustic loss of from about 15 to about 60 dB/mm; (3) a thiophene compound that reduces the viscosity of the ink from about 10 centipoise to about 5 centipoise, and which compound possesses an acoustic loss of from about 5 to about 40 dB/mm, and which ink yields images with crease values of between about 5 to about 10, haze values of between about 10 to about 15, gloss values between about 85 to about 90, and which ink possesses an acoustic-loss value of from about 10 to about 80 dB/mm, and which ink possesses a viscosity of from about 1 centipoise to about 10 centipoise at a temperature of from about 125° C. to about 165° C.; a process which comprises providing an acoustic ink printer having a pool of the liquid ink with a free surface, and a printhead including at least one droplet ejector for radiating the free surface of the invention ink with focused acoustic radiation to eject individual droplets of ink therefrom on demand, the radiation being brought to focus with a finite waist diameter in a focal plane, and causing droplets of the ink to be ejected in imagewise pattern onto a substrate; a process wherein the ink is comprised of (1) a solid acid salt with a melting point of about 75° C. to about 100° C., and an acoustic loss of about 25 to about 80 dB/mm; (2) a conductive quaternary compound with a melting point of about 80° C. to about 100° C. and an acoustic loss of about 15 to about 60 dB/mm; (3) the viscosity modifying compound reduces the viscosity of ink, and possesses an acoustic loss of from about 5 to about 40 dB/mm; (4) a UV lightfastness absorber; (5) an antioxidant; and (6) a colorant, and which ink generates images with crease values of about 5 to about 10, haze values of about 10 to about 15, gloss values of about 85 to about 90, and which ink possesses an acoustics loss value of from about 10 to about 80 dB/mm, and which ink possesses a viscosity of from about 1 centipoise to about 10 centipoise at a temperature of from about 125° C. to about 165° C.; an ink wherein the colorant is a pigment, or a dye present in an amount of from about 0.5 to about 20 percent by weight; an ink wherein the colorant is a pigment of carbon black; an ink wherein the colorant is a pigment of cyan, magenta, yellow, black, or mixtures thereof; an ink wherein the acid salt is selected from diethyldithiocarbamic acid ammonium salt, diethyldithiocarbamic acid diethylammonium salt, or L-alanine ethyl ester hydrochloride; the quaternary compound is selected from the group consisting of dodecyl triphenylphosphonium bromide; 1,3-didecyl-2-2-methylimidazolium chloride; 1-ethyl-3-methyl-1-H-imidazolium chloride; cetylpyridinium chloride monohydrate; a viscosity modifying compound possessing a melting point of about 40° C. to about 140° C., an acoustic-loss value of from about 5 to about 40 dB/mm, and which compound is selected from terthiophene, tetrabromo thiophene and 3-thiophene glyoxylic acid, the lightfastness is a UV absorber present in an amount of from about 5 to about 1 percent by weight and is selected from 2-dodecyl-N-(2,2,6,6-tetramethyl-4-piperidinyl) succinimide, and [1,2,2,6,6-pentamethyl-4-piperidinyl/β,β,β',β'-tetramethyl-3,9-(2,4,8,1 0-tetraoxo spiro (5,5) undecane)diethyl]-1,2,3,4-butane tetracarboxylate, and the colorant is present in an amount of from about 15 to about 1 percent by weight; an ink with a conductivity of from about 6 to about 7.5 [log(pico.mho/cm)] at a temperature of from about 100° C. to about 170° C., viscosity of from about 1 centipoise to about 10 centipoise, and which ink provides images with crease values of about 5 to about 15, haze values of about 10 to about 15, and gloss values of about 85 to about 90; an ink with a conductivity of from 6 to about 7.5 [log(pico.mho/cm)], a viscosity of from about 1 centipoise to about 10 centipoise and an acoustic loss of from about 10 to about 80 dB/mm and which ink provides images with crease values of about 5 to about 10, haze values of about 10 to about 15, and gloss values of about 80 to about 95; an ink composition comprised of (1) an acid salt with a melting point of from about 60 to about 120° C.; (2) a quaternary ammonium compound; (3) a thiophene compound; (4) a lightfastness UV absorber; (5) a lightfast antioxidant; and (6) a colorant; an ink wherein the colorant is a pigment; an ink wherein the colorant is a dye; an ink wherein the quaternary ammonium compound is dodecyltriphenylphosphonium bromide; 1,3-didecyl-2-2-methylimidazolium chloride, 1-ethyl-3-methyl-1-H-imidazolium chloride, or cetylpyridinium chloride monohydrate; and change inks, that is, for example, an ink that changes from a liquid state to solid state in a suitable period of time, for example from about 1 to about 100 milliseconds and preferably in less than or equal to about 10, such as from about 2 to about 7 milliseconds, and which inks contain a nonaqueous phase-change color spreading acid salt compound, that for example, can substantially fill the pores of paper, and which compound has a melting point of preferably equal to about, or lower than about 120° C., and preferably between about 75° C. to about 100° C., and with a low acoustic loss value of equal to about, or below about 100 dB/mm; (2) a conductive quaternary salt having a melting point of between about 80° C. to about 120° C., and preferably between about 80° C. to about 100° C., and with low acoustic loss, which enables a reduction, or minimization of energy consumption, and which acoustic loss is below or about equal to from about 45 to about 65 dB/mm; (3) a conductive viscosity modifying compound that reduces the viscosity of ink from about 10 centipoise to about 5 centipoise; (4) a lightfastness UV absorber; (5) a lightfastness antioxidant; and (6) a colorant such as a dye, a pigment or mixtures thereof.

More specifically, the present invention is directed to phasechange acoustic ink compositions comprised of an optional oxazoline compound, and (1) a solid acid salt having a melting point of lower than about 120° C. and preferably between about 75° C. and about 100° C., and with a low acoustic loss, for example, below about 100 dB/mm, and preferably in the range of between about 25 to about 80 dB/mm; (2) a conductive quaternary compound having a melting point of between about 80° C. to 120° C. and preferably between apreferably between about 80° C. to about 100° C. and with low acoustic loss, and which acoustic loss is, for example, below about 65 dB/mm, and preferably in the range of between about 15 to about 60 dB/mm; (3) a conductive viscosity modifying compound that reduces the viscosity of ink of, for example, from about 10 centipoise to about 5 centipoise, and which compound possesses an acoustic loss of, for example, in the range of between about 5 to about 40 dB/mm; (4) a lightfastness component, and preferably a UV absorber; (5) an antioxidant; and (6) a colorant, and wherein there can be generated with such inks excellent developed images on plain and coated papers with acceptable image permanence, excellent projection efficiency on transparencies without a post fusing step, and excellent crease resistance, and wherein the inks possess acceptable, and in embodiments superior lightfastness of between, for example, about 90 to about 100 percent and superior waterfastness between, for example, about 95 to about 100 percent. Moreover, in embodiments of the present invention, there is enabled with the ink the elimination, or minimization of undesirable paper curl since water need not be present, or minimum amounts less than 1 percent of water may be present in embodiments for the invention inks, and it is preferred that there be an absence of water. When water is not present in the inks, a dryer can be avoided thereby, for example, minimizing the cost of the acoustic ink jet apparatus and process.

The ink composition contains, for example, the following range amounts, respectively, for each of the components 1 to 6: [1+39+59+0.25+0.25+0.5=100] to [59+0.5+0.5+10.0+10.0+20.0=100], and preferably [15+32+50+1+1+1=100] to [45+5+15+10+10+15=100]. These composition ranges, and the others indicated herein, were established using a number of known techniques, such as a statistical design based on the analyses of experimental ink data of viscosity at about 150° C., jettability at about 150° C., image quality (high optical density, low crease, high gloss), lightfastness, and waterfastness values.

The vehicle acid salt, or solid organic acid salt compound with, for example, a melting point of from about 60° C. to about 120° C., and preferably from about 75° C. to about 100° C. is preferably present, for example, in an amount of from about 1 to about 59 percent by weight, the conductive quaternary compound with, for example, an acoustic-loss value of from about 15 to about 60 dB/mm is present in the ink composition in an amount of, for example, from about 39 to about 0.5 percent by weight, the viscosity improving thiophene compound with an acoustic-loss value of, for example, from about 5 to about 40 dB/mm is present in the ink composition in an amount of, for example, from about 59 to about 0.5 percent by weight, the lightfastness preferably a UV absorber is present, for example, in an amount of from about 0.25 to about 10 percent by weight, the antioxidant is, for example, present in an amount of from about 0.25 to about 10 percent by weight, and the colorant is, for example, present in an amount of from about 0.5 to about 20 percent by weight, and wherein the weight percent of all ink components is about 100 percent.

In preferred embodiments, the organic acid salt is present in an amount of from about 15 to about 45 percent by weight, the conductive quaternary compound is present in an amount of from about 32 to about 5 percent by weight, the viscosity thiophene compounds, such as thiophene, is present in the ink composition in an amount of, for example, from about 50 to about 15 percent by weight, the lightfastness component, such as the UV absorber is present in an amount of from about 1 to about 10 percent by weight, the antioxidant is present in an amount of from about 1 to about 10 percent by weight, and the colorant is present in an amount of from about 1 to about 15 percent by weight.

Examples of the acid salt, which is preferably an organic acid salt compound with a melting point of between about 75° C. to about of 120° C., and preferably an acoustic-loss value of between about 25 to about 80 dB/mm, include (1) diethyldithiocarbamic acid ammonium salt, (Aldrich #35,954-8); (2) diethyidithiocarbamic acid diethylammonium salt, (Aldrich #31,811-6); (3) L-alanine ethyl ester hydrochloride, (Aldrich #85,566-9); (4) DL-alanine ethyl ester hydrochloride, (Aldrich #26,886-0); (5) ethyl 4-aminobutyrate hydrochloride, (Aldrich #39,066-6); (6) 2-ethyl-2-thiopseudourea hydrobromide, (Aldrich #30,131-0); (7) formamidine hydrochloride, (Aldrich #26,860-7); (8) N-methylhydroxylamine hydrochloride, (Aldrich #M5,040-0), mixtures thereof, and the like.

Quaternary compound examples, preferably conductive in nature, include (1) azidotris (diethylamino) phosphonium bromide, (Aldrich #30,082-2); (2) cetylpyridinium chloride monohydrate, (Aldrich #85,556-1); (3) trimethylsulfonium methyl sulfate, (Aldrich #30,359-3); (4) tetrakis (decyl) ammonium bromide, (Aldrich #36,517-3); (5) tetraheptyl ammonium bromide, (Aldrich #39,693-1); (6) tetrabutylphosphonium chloride, (Aldrich #14,480-0); (7) 3-ethyl-5-(2-hydroxyethyl)-4-methylthiazolium bromide, (Aldrich #33,124-4); (8) (-)-N-dodecyl-N-methylepherdinium bromide, (Aldrich #23,540-7); (9) 3,4-dimethyl-5-(2-hydroxyethyl)thiazolium iodide, (Aldrich #25,782-6); (10) dodecyltriphenylphosphonium bromide, (Aldrich #17,262-6), (Aldrich #22,321-2); (11) tetraoctylammonium bromide, (Aldrich #39,695-8); (12) 1,3-didecyl-2-2-methylimidazolium chloride, (Aldrich #43,378-0); (13) 1-ethyl-3-methyl-1-H-imidazolium chloride, (Aldrich #27,284-1), mixtures thereof, and the like.

Examples of viscosity compounds, which may also be conductive in embodiments, and wherein this compound may function to modify the conductivity of the phase-change ink from, for example, about 5 to about 7 [log (pico.mho/cm)], are thiophene compounds selected from the group consisting of: (1) 3-acetylthiophene, (Aldrich #19,632-0); (2) 2-acetyl-5-bromothiophene, (Aldrich #32,973-8); (3) 2-acetyl-5-chlorothiophene, (Aldrich #24,707-3); (4) 3-acetyl-2,5-dichloro thiophene, (Aldrich #43,950-9); (5) tetrabromo thiophene, (Aldrich #T,540-9); (6) 2-thiopheneacrylic acid, (Aldrich #13,058-3); (7) 2-thiopheneacetic acid, (Aldrich #19,594-4); (8) 3-thiopheneacetic acid, (Aldrich #22,063-9); (9) 2-thiophenecarboxylic acid, (Aldrich #T3,260-3); (10) 3-thiophenecarboxylic acid, (Aldrich #24,776-6); (11) 3-thiophene glyoxylic acid, (Aldrich #22,227-5); (12) 3-thiophene malonic acid, (Aldrich #21,531-7); (13) 2-thiophenecarboxylic hydrazide, (Aldrich #T3,261-1); (14) 2,3-thiophene dicarboxaldehyde, (Aldrich #42,987-2); (15) 2,5-thiophene dicarboxaldehyde, (Aldrich #42,987-2); (16) terthiophene, (Aldrich #31,107-3); (17) 2-nitrothiophene, (Aldrich #N2,9700-4); (18) 5-nitro-2-thiophene carboxaldehyde, (Aldrich #30,229-5); (19) trans-2-(2-nitrovinyl)thiophene, (Aldrich #38,758-4); (20) 3-benzoylthiophene, (Aldrich #B1,480-9), and mixtures thereof.

Lightfastness components or compounds that primarily protect the developed images from UV degradation and present in the ink composition in an amount of, for example, from about 0.25 to about 10 percent by weight, and preferably from about 1 to about 10 percent by weight include, for example, (1) 1,1-(1,2-ethane-diyl)bis(3,3,5,5-tetramethyl piperazinone), Goodrich Chemicals; (2) 2,2,4-trimethyl-1,2-hydroquinoline, Mobay Corporation; (3) 2-(4-benzoyl-3-hydroxy phenoxy)ethylacrylate; (4) 2-dodecyl-N-(1,2,2,6,6-pentamethyl-4-piperidinyl) succinimide, Aldrich Chemicals; (5) 2,2,6,6-tetramethyl-4-piperidinyl/β,β,β',β'-tetramethyl-3,9-(2,4,8,10-tetraoxospiro(5,5)-undecane) diethyl]-1,2,3,4-butane tetracarboxylate, or mixtures thereof.

Examples of lightfastness antioxidants that primarily protect the developed images from oxidation and are present in the ink composition in an amount of, for example, from about 0.25 to about 10 percent by weight, and preferably from about 1 to about 10 percent by weight include (1) antimony dialkyl phosphorodithioate; (2) molybdenum oxysulfide dithio carbamate, both available from Vanderbilt Corporation; (3) nickel-bis(o-ethyl(3,5-di-tert-butyl-4-hydroxybenzyl) phosphonate, Ciba Geigy Corporation; (4) tetra sodium-N-(1,2-dicarboxyethyl)-N-octadecyl sulfosuccinamate, American Cyanamid Corporation, or mixtures thereof.

Suitable colorants present in the ink composition in an amount of, for example, from about 0.5 to about 20 percent by weight, and preferably from about 2 to about 12 percent by weight, include pigments and dyes, with solvent dyes being preferred. Any suitable dye or pigment may be selected providing, for example, that it is preferably capable of being dispersed or dissolved in the vehicle and is compatible with the other ink components. Colorants include pigments, dyes, mixtures thereof, mixtures of dyes, mixtures of pigments, and the like.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E.D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (CibaGeigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange), (Matheson, Colemen Bell); Sudan II (Orange), (Matheson, Colemen Bell); Sudan Orange G (Aldrich); Sudan Orange 220 (BASF); Paliogen Orange 3040 (BASF); Ortho Orange OR 2673 (Paul Uhlich); Paliogen Yellow 152,1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot); Carbon Black 5250, Carbon Black 5750 (Columbia Chemical Company); and examples of suitable dyes include Pontamine, Food Black 2, Carodirect Turquoise FBL Supra Conc. (Direct Blue 199), available from Carolina Color and Chemical; Special Fast Turquoise 8 GL Liquid (Direct Blue 86), available from Mobay Chemical; Intrabond Liquid 5 Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E6- BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton and Knowles; Cartasol Yellow GTF Presscake, available from Sandoz, Inc.; Tartrazine Extra Conc. (FD&C Yellow #5, Acid Yellow 23), available from Sandoz, Inc.; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon; Basacid Black X 34, available from BASF; Carta Black 2GT, available from Sandoz, Inc.; and the like. Particularly preferred are solvent dyes, and within the class of solvent dyes, spirit soluble dyes are preferred because of their compatibility with the vehicles and dye leveling compounds of the present application. Examples of suitable spirit solvent dyes include: Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G, Aizen Spilon Yellow C-GNH (Hodogaya Chemical Company); Sirius Supra Yellow GD 167, Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); and the like. Neozapon Black X51 [C.I. Solvent Black; C.I. #12195] (BASF); Sudan Blue 670 [C.I. #61554] (BASF); Sudan Yellow 146 [C.I. #12700] (BASF); Sudan Red 462 [C.I. #26050] ( BASF) are preferred.

The inks of the present invention can be prepared by any suitable method, such as the simple mixing and heating of the ink components. For example, the ink can be prepared by mixing about 15 percent by weight of acid salt having an acoustic-loss value of less than about 80 dB/mm and a melting point of between about 75° C. to about 120° C.; 25 percent by weight of a conductive quaternary compound having a melting point of between about 80° C. to about 120° C.; 45 percent by weight of the viscosity modifying thiophene compound; 5 percent by weight of a lightfast UV absorber; 5 percent by weight of lightfast antioxidant and 5 percent by weight of a colorant. The resulting mixture can then be heated to a temperature of about 120° C. and stirred for a period of about 60 minutes until it formed a homogeneous solution, and subsequently the mixture can be cooled to 25° C.

The acid salts, quaternary salts, thiophene compounds, the lightfastness component, and the antioxidant selected for the phase-change inks are preferably crystalline or semicrystalline in the solid state. A material is considered crystalline when it is comprised of crystals having regular arrangement of its atoms in the space lattice. When this arrangement of atoms in the space lattice is irregular, the material is considered amorphous. The state of having part of the material crystalline and another part as amorphous is referred to as semicrystalline. When solidified on a substrate, such as paper or transparency, the phase change ink materials crystallize in a spherulitic morphology, and wherein the size of the spherulites is preferably, for example, from about 0.1 to about 10 microns, and preferably from about 1 and about 4 microns, for optimum projection efficiency. Also, the opacity usually increases with the size of the spherulites. The spherulite size can be measured by an optical microscope with cross polarized light or by the low angle solid state light scattering method (R. S. Stein and M. B. Rhodes, *J. AppL Phys.*, 31, 1873 (1960)). For example, monochromatic, vertically polarized light is passed through sample (about 5 grams) being measured, and the scattered light is analyzed with another nicol prism, with its optic axis horizontal. This is conventionally known as the Hv scattering method. The spherulite size is measured from the location of the maximum intensity in the four-leaf clover scattering pattern. The small spherulite size is also important for crease resistance. Large spherulites, of size greater than about 5 microns, could result in a brittle print. It is also a purpose of the present invention to control the size of the spherulites, by formulating ternary blends the acid salts, quaternary salts, and thiophene compounds. Furthermore, with the present invention there is provided in embodiments a composition of acid salts, quaternary salts, thiophene compounds, a UV absorber and an antioxidant which when solidified, the resulting ternary blend forms a dispersed phase of small spherulitic crystalline domains in the matrix of each other. The resulting morphology of reduced spherulitic size of from about 6 to 9 micrometers to about 0.5 to 3, and more preferably between about 0.5 to about 1 micrometer measured with an optical microscope, not only improves the projection efficiency, but also increases the crease resistance. Inks with the spherulite size of between 0.5 to 1 micrometer are sometimes considered ideal as these scatter minimum of light thereby improving projection efficiency when printed on transparencies. The resistance to creasing is also increased with reduced spherulite size due to better intramolecular bonding between the ink molecules.

The inks of the present invention are particularly suitable for printing processes wherein the substrate, such as paper, transparency material, or the like, is heated during the printing process to facilitate formation of the liquid crystalline phase within the ink. When transparency substrates are employed, temperatures typically are limited to a maximum of about 100° C. to about 110° C., since the polyester typically employed, as the base sheet in transparency sheets tends to deform at higher temperatures. Specially formulated transparencies and paper substrates can, however, tolerate higher temperatures, and frequently are suitable for exposure to temperatures of 150° C. or even 200° C. in some instances. More specifically, the inks of the present invention are suitable for use in acoustic ink jet printing processes. In acoustic ink jet printing, reference a number of the copending applications and patents recited here, the disclosures of which have been totally incorporated herein by reference, an acoustic beam exerts a radiation pressure against objects upon which it impinges. Thus, when an acoustic beam impinges on a free surface of the ink of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power, reference for example, *IBM Technical Disclosure Bulletin*, Vol. 16, No. 4, September 1973, pages 1168 to 1170, the disclosure of which is totally incorporated herein by reference. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure, which each of the beams exerts against the free ink surface, to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is an important, critical design parameter of an ink jet because it determines the size of the droplets of ink that the jet ejects. As a result, the size of the ejection orifice cannot be increased without sacrificing resolution. Acoustic printing has increased intrinsic reliability since usually there are no nozzles to clog. Furthermore, small ejection orifices are avoided, so acoustic printing can be performed with a greater variety of inks than conventional ink jet printing, including inks having higher viscosities and inks containing pigments and other particulate components. Acoustic ink printers embodying printheads comprising acoustically illuminated spherical focusing lenses can print precisely positioned pixels (picture elements) at resolutions which are sufficient for high quality printing of relatively complex images. It has also been determined that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing; (2) matrix configured ejector arrays for matrix printing; and (3) several different types of pagewidth ejector arrays, ranging from (i) single row, sparse arrays for hybrid forms of parallel/serial printing to (ii) multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), however, in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in *J. Appl. Phys.*, vol. 65, no. 9 (1 May 1989) and references therein, the disclosure of which is totally incorporated herein by reference.

Acoustic-loss measurements recited herein were measured as follows: samples of about 5 grams of the components being measured were placed between two transducers, with the temperature set at 150° C. The samples, about 5 grams each, were permitted to equilibrate at 150° C. for five minutes. The two transducers were brought together to maximize the acoustic signal. The amplitude and the position of the signals were recorded. The two transducers were separated by a distance varying from 25.4 microns to 125.4 microns recording each time the amplitude and the position of the signal. Each measurement was performed three times and with three different samples of the same material. The attenuation dB/mm was then calculated by ratioing the amplitude values obtained at different separation distances.

The optical density values of, for example, Black [Neozapon Black X51 C.I. #12195] between, for example, 2.1 to 2.3, Cyan [Sudan Blue 670 C.I. #61554] between 1.80 to 1.85, Magenta Sudan Red 462 [C.I. #26050], between 1.90 to 1.95 and Yellow [Sudan Yellow 146 C.I. #12700] between 1.37 to 1.45, recited herein were obtained on a Pacific Spectrograph Color System. The system is comprised of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information The conductivity values expressed as log (picomho/cm) and recited herein were measured under melt conditions at about 150° C. by placing an aluminum electrode in the melt and reading the resistivity output on a GenRad 1689 precision RLC Digibridge at a frequency of 1 K.Hz. Conductivity is calculated from the resistivity data.

The lightfastness values of ink jet images, for example, between about 90 to about 100 percent, and preferably between about 95 to about 100 percent, were measured in the Mark V Lightfast Tester obtained from Microscal Company, London, England. The waterfast values of the ink jet images were obtained from measured optical density data and after washing with water at 25° C. for five minutes.

The viscosity values recited herein were preferably measured at about 150° C. with a Stress Rheometer from Cari-Med model CSL 100. All Example experiments were performed at a shear rate of 1,250 $S^{-1}$.

The average width of the creased image due to pressure was obtained on a colored and black solid area images printed on paper by (a) folding inwards the printed area of the image; (b) passing on the folded image a standard TEFLON coated copper roll 2 inches in width, 3 inches in outer diameter, 2.25 inches in inner diameter and weighing 860 grams; (c) unfolding the paper and wiping the loose toner from the creased imaged surface with a cotton swab; and (d) measuring the average width of the toner free creased area with an image analyzer.

The haze values of images, for example, between about 10 to about 30, and preferably between about 10 to about 20 recited herein were measured on images printed on uncoated polyester, such as MYLAR®, with a Haze meter XL-211, HAZEGARD® System obtained from Pacific Scientific Company.

The following Examples are provided. All parts and percentages are by weight unless otherwise indicated.

EXAMPLE I

A black phase-change ink composition was prepared by mixing 15 percent by weight of an ink vehicle of the acid salt diethyidithiocarbamic acid ammonium salt, (Aldrich #35, 954-8), having a melting point of 80° C. and an acoustic-loss value of 39 dB/mm; 25 percent by weight of the conductive quaternary compound stearyltributylphosphonium bromide, (Aldrich #29,303-2) having a melting point of 72° C., an acoustic-loss value of 29 dB/mm and conductivity of 6.8 [log(pico.mho/cm)]; 45 percent by weight of the viscosity modifying compound 2-acetyl-5-bromothiophene, (Aldrich #32,973-8), having an acoustic-loss value of 27 dB/mm, a melting point of 95° C. and a conductivity of 6.8 [log (pico.mho/cm)]; 5 percent by weight of the UV absorber 2-dodecyl-N- (2,2,6,6-tetramethyl-4-piperidinyl) succinimide, (Aldrich #41,317-8); 5 percent by weight of the antioxidant tetra sodium-N-(1,2-dicarboxyethyl)-Noctadecyl sulfosuccinamate, Aerosol 22N, American Cyanamid Corporation; and 5 percent by weight of the colorant Neozapon Black X51 [C.I. Solvent Black; C.I. #12195] (BASF). The ink mixture resulting was heated to a temperature of about 120° C. and stirred for a period of about 60 minutes until it formed a homogeneous solution, and subsequently the solution was cooled to 25° C. The resulting black ink had an acoustic loss value of 45 dB/mm, a viscosity of 5.55 cps at 150° C., and conductivity of 7.0 [log(pico.mho/cm)] at 150° C. (150° C. throughout the Examples).

EXAMPLE II

A blue phase-change ink composition was prepared by mixing 15 percent by weight of acid salt diethyldithiocarbamic acid diethylammonium salt, (Aldrich #31,811-6), having a melting point of 83° C., an acoustic-loss value of 37 dB/mm and conductivity of 6.8 [log(pico.mho/cm)]; 25 percent by weight of the quaternary compound 1,3-didecyl-2-2-methylimidazolium chloride, (Aldrich #43,378-0), having a melting point of 82° C., an acoustic-loss value of 31 dB/mm and conductivity of 8.2 [log(pico.mho/cm)]; 45 percent by weight of the viscosity modifying compound tetrabromo thiophene, (Aldrich #T,540-9) having a melting point of 117° C., an acoustic-loss value of 38 dB/mm and conductivity of 7.2 [log(pico.mho/cm]; 5 percent by weight of the UV absorber 2-dodecyl-N-(2,2,6,6-tetramethyl-4-piperidinyl) succinimide, (Aldrich #41,317-8); 5 percent by weight of the antioxidant tetra sodium-N-(1,2-dicarboxyethyl)-N-octadecyl sulfosuccinamate, Aerosol 22N, American Cyanamid Corporation; and 5 percent by weight of the colorant Sudan Blue 670 [C.I. #61554] (BASF). The mixture resulting was heated to a temperature of about 120° C. and stirred for a period of about 60 minutes until it formed a homogeneous solution, and the solution was subsequently cooled to 25° C. The resulting blue ink had an acoustic loss value of 40 dB/mm, a viscosity of 5.45 cps and a conductivity value of 7.5 [log(pico.mho/cm)] at 150° C.

EXAMPLE III

A yellow phase-change ink composition was prepared by mixing 15 percent by weight of the acid salt L-alanine ethyl ester hydrochloride, (Aldrich #85,566-9), having a melting point of 79° C. (degrees Centigrade) an acoustic-loss value of 35 dB/mm and a conductivity of 6.05 [log(pico.mho/cm)]; 25 percent by weight of the conductive quaternary compound dodecyl triphenyl phosphonium bromide, (Aldrich #17,262-6), having a melting point of 87° C., an acoustic-loss value of 34 dB/mm and a conductivity of 6.65 [log(picb.mho/cm)]; 45 percent by weight of the viscosity modifying compound 3-thiophene acetic acid, (Aldrich #22, 063-9), having a melting point of 79° C., an acoustic-loss value of 38 dB/mm and a conductivity of 7.2 [log(pico.mho/cm]; 5 percent by weight of the UV absorber 2-dodecyl-N-(2,2,6,6-tetramethyl-4-piperidinyl) succinimide, (Aldrich #41,317-8); 5 percent by weight of the antioxidant tetrasodium-N-(1,2-dicarboxyethyl)-N-octadecyl sulfosuccinamate, Aerosol 22N, American Cyanamid Corporation; and 5 percent by weight of the colorant Sudan Yellow 146 [C.I. #12700] (BASF). The mixture resulting was heated to a temperature of about 100° C. and stirred for a period of about 60 minutes until it formed a homogeneous solution, and subsequently the solution was cooled to 25° C. The resulting yellow ink had an acoustic loss value of 38 dB/mm, a viscosity of 5.65 cps and conductivity of 6.8 [log(pico.mho/ cm] at 150° C.

EXAMPLE IV

A red phase-change ink composition was prepared by mixing 15 percent by weight of the acid salt DL-alanine ethyl ester hydrochloride, (Aldrich #26,886-0), having a melting point of 88° C., an acoustic-loss value of 33 dB/mm and a conductivity of 6.5 [log(pico.mho/cm)]; 25 percent by weight of the conductive quaternary compound trimethylsulfonium methyl sulfate, (Aldrich #30,359-3), having a melting point of 93° C., an acoustic-loss value of 32 dB/mm and a conductivity of 6.7 [log(pico.mho/cm)]; 45 percent by weight of the viscosity modifying compound 3-thiophene glyoxylic acid, (Aldrich #22,227-5), having a melting point of 90° C., an acoustic-loss value of 38 dB/mm and a conductivity of 6.9 [log(pico.mho/cm)]; 5 percent by weight of the UV absorber 2-dodecyl-N-(2,2,6,6-tetramethyl-4-piperidinyl) succinimide, (Aldrich #41,317-8); 5 percent by weight of the antioxidant tetra sodium-N-(1,2-dicarboxyethyl)-N-octadecyl sulfosuccinamate, Aerosol 22N, American Cyanamid Corporation; and 5 percent by weight of the colorant Sudan Red 462 [C.I. #26050] (BASF). The mixture resulting was heated to a temperature of about 120° C. and stirred for a period of about 60 minutes until it formed a homogeneous solution, and subsequently the solution was cooled to 25° C. The resulting red ink had an acoustic loss value of 38 dB/mm, a viscosity of 5.42 cps and a conductivity of 6.7 [log(pico.mho/cm at 150° C.

Each of the above prepared four inks was incorporated into an acoustic ink jet printer as disclosed in U.S. Pat. No. 4,745,419, the disclosure of which is totally incorporated herein by reference, equipped with a carrier for transporting a generally uniformly thick film of hot melt ink across its printhead, together with a heating means for liquefying the ink as it nears the printhead. The droplet ejectors were acoustically coupled to the ink via the carrier, and their output focal plane was essentially coplanar with the free surface of the liquefied ink, thereby enabling them to eject individual droplets of ink therefrom on command. The inks were moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating. A jetting frequency of 160 MHz was used to generate drops of about 2 picoliters, up to 12 drops per pixel at 600 spi. The images formed on paper exhibited excellent color quality with optical density values of 2.50 (black), 1.92 (cyan), 1.95 (magenta), 1.45 (yellow), sharp edges, light-fastness values of black (99.0 percent), cyan (98.5 percent), magenta (967 percent), yellow (99 percent), and waterfast values of black (98.5 percent), cyan (97.5 percent), magenta (96 percent), yellow (100 percent). The crease values of the black, cyan, magenta and yellow ink images were measured at black (5), cyan (10), magenta (10),yellow (9). The images formed on uncoated MYLAR® exhibited excellent color quality with optical density values of 1.55 (black), 1.56 (cyan), 1.48 (magenta), 0.95 (yellow), and sharp edges. The haze values of the black, cyan, magenta and yellow ink images were measured at black (13), cyan (15), magenta (10), yellow (12). The gloss values of images developed with the above prepared inks were measured at about 90. The ink spherulite radius was measured to be between 1 to 3 micrometers, enabling, for example, haze values of between 10 to 15 when printed on transparencies.

EXAMPLE V

A black phase-change ink composition was prepared by mixing 15 percent by weight of the acid salt ethyl 4-aminobutyrate hydrochloride, (Aldrich #39,066-6), having a melting point of 90° C., an acoustic-loss value of 39 dB/mm and a conductivity of 5.9 [log(pico.mho/cm)]; 25 percent by weight of the conductive quaternary compound tetrabutylammonium bromide, (Aldrich #30,159-0), having a melting point of 75° C., an acoustic-loss value of 28 dB/mm and a conductivity of 6.1 [log(pico.mho/cm)]; 45 percent by weight of the viscosity modifying compound 2,3-thiophene dicarboxaldehyde, (Aldrich #42,987-2), having a melting point of 77° C., an acoustic-loss value of 39 dB/mm and a conductivity of 6.8 [log(pico.mho/cm)]; 5 percent by weight of the UV absorber [1,2,2,6,6-pentamethyl-4-piperidinyl β,β,β',β'-tetramethyl-3,9-(2,4,8,10-tetraoxo spiro (5,5) undecane) diethyl]-1,2,3,4-butane tetracarboxylate, Mixxim HALS 63, Fairmount Corporation; 5 percent by weight of the antioxidant tetra sodium-N-(1,2-dicarboxyethyl)-N-octadecyl sulfosuccinamate, Aerosol 22N, American Cyanamid Corporation; and 5 percent by weight of the colorant Neozapon Black X51 [C.I. Solvent Black; C.I. #12195] (BASF). The resulting mixture was heated to a temperature of about 120° C. and stirred for a period of about 60 minutes until it formed a homogeneous solution, and subsequently the solution was cooled to 25° C. The resulting black ink had an acoustic loss value of 39 dB/mm, a viscosity of 5.5 cps and a conductivity of 6.1 [log(pico.mho/cm)] at 150° C.

EXAMPLE VI

A blue phase-change ink composition was prepared by mixing 15 percent by weight of the acid salt 2-ethyl-2-thiopseudourea hydrobromide, (Aldrich #30,131-0), having a melting point of 89° C., an acoustic-loss value of 35 dB/mm and a conductivity of 6.0 [log(pico.mho/cm)]; 25 percent by weight of the conductive quaternary compound 1-ethyl-3-methyl-1-H-imidazolium chloride, (Aldrich #27, 284-1), having a melting point of 78° C., an acoustic-loss value of 30 dB/mm and a conductivity of 8.0 [log(pico.mho/cm)]; 45 percent by weight of the viscosity modifying compound terthiophene, (Aldrich #31,107-3), having a melting point of 94° C., an acoustic-loss value of 34 dB/mm and conductivity of 7.8 [log(pico.mho/cm]; 5 percent by weight of the UV absorber 2-dodecyl-N-(2,2,6,6-tetra methyl-4-piperidinyl) succinimide, (Aldrich #41,317-8); 5 percent by weight of the antioxidant tetra sodium-N-(1,2-dicarboxyethyl)-N-octadecyl sulfosuccinamate, Aerosol 22N, American Cyanamid Corporation; and 5 percent by weight of the colorant Sudan Blue 670 [C.I. #61554] (BASF). The mixture resulting was heated to a temperature of about 120° C. and stirred for a period of about 60 minutes until it formed a homogeneous solution, and subsequently the solution was cooled to 25° C. The resulting blue ink had an acoustic loss value of 39 dB/mm, a viscosity of 5.45 cps and conductivity of 7.1 [log(pico.mho/cm] at 150° C.

EXAMPLE VII

A yellow phase-change ink composition was prepared by mixing 15 percent by weight of the acid salt formamidine hydrochloride, MP 84 to 87° C., (Aldrich #26,860-7), having a melting point of 86° C., an acoustic-loss value of 35 dB/mm and a conductivity of 6.6 [log(pico.mho/cm)]; 25 percent by weight of the conductive quaternary compound 3-ethyl-5-(2-hydroxyethyl)-4-methylthiazolium bromide, (Aldrich #33,124-4), having a melting point of 85° C., an acoustic-loss value of 33dB/mm and a conductivity of 6.6 [log(pico.mho/cm)]; 45 percent by weight of the viscosity modifying compound terthiophene, (Aldrich #31,107-3), having a melting point of 94° C., an acoustic-loss value of 34 dB/mm and a conductivity of 7.8 [log(pico.mho/cm ]; 5 percent by weight of the antioxidant tetrasodium-N-(1,2-dicarboxyethyl)-N-octadecyl sulfosuccinamate, Aerosol 22N, American Cyanamid Corporation; and 5 percent by weight of the colorant Sudan Yellow 146 [C.I. #12700] (BASF). The mixture resulting was heated to a temperature of about 120° C. and stirred for a period of about 60 minutes until it formed a homogeneous solution, and subsequently the solution was cooled to 25° C. The resulting yellow ink had an acoustic loss value of 38 dB/mm, a viscosity of 5.35 ps, and a conductivity of 7.0 [log(pico.mho/cm] at 150° C.

EXAMPLE VIII

A red phase-change ink composition was prepared by mixing 15 percent by weight of the acid salt N-methylhydroxylamine hydrochloride, (Aldrich # M5,040-0), having a melting point of 87° C., an acoustic-loss value of 38 dB/mm, and a conductivity of 5.8 [log(pico.mho/cm]; 25 percent by weight of the conductive quaternary compound 1-ethyl-3-methyl-1-H-imidazolium chloride, (Aldrich #27,284-1), having a melting point of 78° C., an acoustic-loss value of 30 dB/mm and a conductivity of 8.0 [log(pico.mho/cm)]; 45 percent by weight of the viscosity modifying compound terthiophene, (Aldrich #31,107-3), having a melting point of 94° C., an acoustic-loss value of 34 dB/mm and a conductivity of 7.8 [log(pico.mho/cm]; 5 percent by weight of the UV absorber 2-dodecyl-N-(2,2,6,6-tetramethyl-4-piperidinyl) succinimide, (Aldrich #41,317-8); 5 percent by weight of the antioxidant tetrasodium-N-(1,2-dicarboxyethyl)-N-octadecyl sulfosuccinamate Aerosol 22N, American Cyanamid Corporation; and 5 percent by weight of the colorant Sudan Red 462 [C.I. #26050] (BASF). The mixture resulting was heated to a temperature of about 120° C. and stirred for a period of about 60 minutes until it formed a homogeneous solution, and subsequently the solution was cooled to 25° C. This red ink had an acoustic loss value of 38 dB/mm, a viscosity of 5.62 cps and conductivity of 7.2 at 150° C.

Each of the above four ink was incorporated into the above acoustic ink jet printing test fixture. A jetting frequency of 160 MHz was used to generate drops of about 2 picoliters, up to 12 drops per pixel at 600 spi. The images formed on paper exhibited excellent color quality with optical density values of 2.55 (black), 1.97 (cyan), 1.90 (magenta), 1.40 (yellow), sharp edges, lightfast values of black (97.5 percent), cyan (98.5 percent), magenta (96 percent), yellow (99 percent), and with waterfast values of black (98.0 percent), cyan (99.5 percent), magenta (97), yellow (100 percent). The crease values of the black, cyan, magenta and yellow ink images were measured at black (8), cyan (10), magenta (10), yellow (8). The images formed on uncoated MYLAR® exhibited excellent color quality with optical density values of 1.51 (black), 1.52 (cyan), 1.44 (magenta), 0.92 (yellow), sharp edges. The haze values of black, cyan, magenta and yellow developed ink images were measured at black (12), cyan (14), magenta (8), yellow (10). The gloss values of the developed images were measured at about 90 with all of the inks. The ink spherulite radius was measured between 1 to 3 micrometers leading to haze values of between 10 to 15 when the above prepared inks were printed on transparencies.

The inks of U.S. Pat. No. 5,667,568, based on blends of N'-dodecylbis-stearamide, 95 percent by weight, and a colorant selected from Neozapon Black X51 [C.I. Solvent Black; C.I. #12195] (BASF), Sudan Blue 670 [C.I. #61554] (BASF), Sudan Yellow 146 [C.I. #12700] (BASF), Sudan Red 462 [C.I. #26050] (BASF); 5 percent by weight and inks of the prior art U.S. Pat. No. 5,698,128 derived from blends of the reaction product of an anhydride and an organoamine; 95 percent by weight and a colorant selected from Neozapon Black X51 [C.I. Solvent Black; C.I. #12195] (BASF), Sudan Blue 670 [C.I. #61554] (BASF), Sudan Yellow 146 [C.I. #12700] (BASF), Sudan Red 462 [C.I. #26050] (BASF); 5 percent by weight generally possess viscosities in the range of about 10 to about 15 centipoise and conductivity values in the range of 3.5 to 4.5 log(picomho/cm). The inks of U.S. Pat. No. 5,698,017 comprised, for example, of blends of 2-stearyloxazoline, 95 percent by weight and a colorant selected from Neozapon Black X51 [C.I. Solvent Black; C.I. #12195] (BASF), Sudan Blue 670 [C.I. #61554] (BASF), Sudan Yellow 146 [C.I. #12700] (BASF), Sudan Red 462 [C.I. #26050] (BASF), 5 percent by weight, yield images on paper having crease values of between 65 to 125, gloss values of 60 to 80 and ink spherulite radius (ink spherulite radius is the radius of the ink spheres formed when the ink cools down from the molten state at the jetting temperature of 150° C. to room temperature of 25° C.) of between 8 to 9 micrometers. A primary advantage of the reduced ink spherulite radius of the invention inks in embodiments is that when the inks are printed on a transparency, an ink with ink spherulite radius of between 8 to 9 micrometers yields images with haze values of between 50 to 60 whereas an ink having ink spherulite radius of between about 4 to about 6 micrometers results in haze values of between about 10 to about 30.

In embodiments, the inks of the present invention possess viscosities of about 5 to 5.5 centipoise and conductivity values of 6.5 [log pico.mho/cm]. The advantage of these low viscosity and high conductivity inks resides, for example, in reduced power consumption by about 35 percent, thereby permitting increased printing speed from about 25 pages per minute to about 40 pages per minute, improved jettability, the drop size of the ink is uniform all across the printhead leading to better ink directionality, that is the velocity of the ink drops has a standard deviation value of between 3 to 5 microns and consequently lower edge raggedness of the developed prints resulted such as a value of 5 microns and preferably lower than 3 microns. The edge raggedness is the deviation of the average width of a line measured from the middle of the line to the edge of the line [also known as mid-frequency line-edge noise (MFLN)] and can be measured with an optical microscope.

Other modifications of the present invention may occur to those of ordinary skill in the art subsequent to a review of the present application, and these modifications, including equivalents thereof, are intended to be included within the scope of the present invention.

What is claimed is:

1. An ink composition comprised of (1) an acid salt; (2) a quaternary compound; (3) a viscosity compound; (4) a lightfastness component; (5) a lightfastness antioxidant; and (6) a colorant.

2. An ink in accordance with claim 1 wherein said acid salt possesses a melting point of from about 60 to about 120° C., said quaternary compound is a conductive compound and possesses a melting point of from about 80° C. to about 120° C., said viscosity modifying compound is a thiophene, and said a lightfastness component is a UV absorber.

3. An ink in accordance with claim 2 wherein (1) said acid salt possesses an acoustic-loss value of from about 25 to about 80 dB/mm; (2) said quaternary compound possesses an acoustic-loss value of from about 15 to about 60 dB/mm; and (3) said thiophene compound possesses an acoustic-loss value of from about 5 to about 40 dB/mm, and wherein said ink possesses an acoustic-loss value of from about 10 to about 80 dB/mm, a viscosity of from about 1 centipoise to about 15 centipoise at a temperature of from about 125° C. to about 165° C., and a conductivity of from about 6 to about 9.

4. An ink in accordance with claim 1 and which ink yields images with crease values of from about 5 to about 10, haze values of from about 10 to about 15, and gloss values of from about 85 to about 90, and which ink possesses an acoustic-loss value of from about 10 to about 80 dB/mm, a viscosity of from about 1 centipoise to about 10 centipoise, and a conductivity of from about 6 to about 7.5 at a temperature of from about 125° C. to about 165° C.

5. An ink in accordance with claim 1 wherein said acid salt is present in an amount of from about 1 to about 59 percent by weight, said quaternary compound is present in an amount of from about 39 to about 0.5 percent by weight, said thiophene compound is present in an amount of from about 59 to about 0.5 percent by weight, said lightfastness component is present in an amount of from about 0.25 to about 10 percent by weight, said antioxidant is present in an amount of from about 0.25 to about 10 percent by weight, and said colorant is present in an amount of from about 0.5 to about 20 percent by weight; and wherein the total of all of said ink components is about 100 percent.

6. An ink composition in accordance with claim 1 wherein said salt is selected from the group consisting of (1) diethyldithiocarbamic acid ammonium salt; (2) diethyldithiocarbamic acid diethylammonium salt; (3) L-alanine ethyl ester hydrochloride; (4) DL-alanine ethyl ester hydrochloride; (5) ethyl 4-aminobutyrate hydrochloride; (6) 2-ethyl-2-thiopseudourea hydrobromide; (7) formamidine hydrochloride; and (8) N-methylhydroxylamine hydrochloride.

7. An ink in accordance with claim 1 wherein said quaternary compound is selected from the group consisting of (1) azidotris (diethylamino) phosphonium bromide; (2) cetylpyridinium chloride monohydrate; (3) trimethylsulfonium methyl sulfate; (4) tetrakis(decyl) ammonium bromide; (5) tetraheptyl ammonium bromide; (6) tetrabutyl phosphonium chloride; (7) 3-ethyl-5-(2-hydroxyethyl)-4-methylthiazolium bromide; (8) (—)-N-dodecyl-N-methylepherdinium bromide; (9) 3,4-dimethyl-5-(2-hydroxyethyl)thiazolium iodide; (10) dodecyltriphenylphosphonium bromide; (11) tetraoctylammonium bromide; (12) 1,3-didecyl-2-2-methylimidazolium chloride; and (13) 1-ethyl-3-methyl-1-H-imidazolium chloride.

8. An ink in accordance with claim 1 wherein said viscosity compound is a thiophene selected from the group consisting of (1) 3-acetyl thiophene; (2) 2-acetyl-5-bromothiophene; (3) 2-acetyl-5-chlorothiophene; (4) 3-acetyl-2,5-dichloro thiophene; (5) tetrabromo thiophene; (6) 2-thiopheneacrylic acid; (7) 2-thiophene acetic acid; (8) 3-thiopheneacetic acid; (9) 2-thiophenecarboxylic acid; (10) 3-thiophenecarboxylic acid; (11) 3-thiophene glyoxylic acid; (12) 3-thiophene malonic acid; (13) 2-thiophenecarboxylic hydrazide; (14) 2,3-thiophene dicarboxaldehyde; (15) 2,5-thiophene dicarboxaldehyde; (16) terthiophene; (17) 2-nitrothiophene; (18) 5-nitro-2-thiophene carboxaldehyde; (19) trans-2-(2-nitrovinyl) thiophene; and (20) 3-benzoylthiophene.

9. An ink composition in accordance with claim 1 wherein the lightfastness component is a UV absorber selected from the group consisting of (1) 1,1-(1,2-ethane-diyl)bis(3,3,5,5-tetramethyl piperazinone); (2) 2,2,4-trimethyl-1,2-hydro quinoline; (3) 2-(4-benzoyl-3-hydroxyphenoxy) ethylacrylate; (4) 2-dodecyl-N-(1,2,2,6,6-pentamethyl-4-piperidinyl)succinimide; and (5) 2,2,6,6-tetramethyl-4-piperidinyl, $\beta,\beta,\beta',\beta'$-tetramethyl-3,9-(2,4,8,10-tetraoxospiro(5,5)-undecane) diethyl]-1,2,3,4-butane tetracarboxylate.

10. An ink in accordance with claim 1 wherein the lightfast antioxidant is selected from the group consisting of (1) antimony dialkyl phosphorodithioate; (2) molybdenum oxysulfide dithio carbamate; (3) (nickel-bis(o-ethyl(3,5-di-tert-butyl-4-hydroxybenzyl)phosphonate; and (4) tetra sodium-N-(1,2-dicarboxyethyl)-N-octadecyl sulfosuccinamate.

11. A printing process which comprises incorporating into an acoustic ink jet printer an ink composition comprised of (1) an acid salt; (2) a quaternary compound; (3) a viscosity compound; (4) a lightfastness component; (5) a lightfastness antioxidant; and (6) a colorant, and causing droplets of the ink to be ejected in imagewise pattern onto a substrate.

12. A process in accordance with claim 11 wherein (1) said solid acid salt possess a melting point of from about 75° C. to about 100° C., and an acoustic loss of from about 25 to about 80 dB/mm; (2) said quaternary compound possesses a melting point of from about 80° C. to about 100° C. and an acoustic loss of from about 15 to about 60 dB/mm; (3) said viscosity thiophene that reduces the viscosity of said ink, and which compound possess an acoustic loss of from about 5 to about 40 dB/mm, and which ink yields images with crease values of between 5 to 10, haze values of between 10 to 15, gloss values of between 85 to 90, and which ink possesses an acoustic-loss value of from about 10 to about 80 dB/mm, and which ink possesses a viscosity of from about 1 centipoise to about 10 centipoise at a temperature of from about 125° C. to about 165° C.

13. A process which comprises providing an acoustic ink printer having a pool of liquid ink comprised of (1) an acid salt; (2) a quaternary compound; (3) a viscosity compound; (4) a lightfastness component; (5) a lightfastness antioxidant; and (6) a colorant with a free surface, and a printhead including at least one droplet ejector for radiating the free surface of said ink with focused acoustic radiation to eject individual droplets of ink therefrom on demand, said radiation being brought to focus with a finite waist diameter in a focal plane, and causing droplets of the ink to be ejected in imagewise pattern onto a substrate.

14. A process in accordance with claim 13 wherein said ink is comprised of (1) a solid acid salt with a melting point of about 75° C. to about 100° C., and an acoustic loss of about 25 to about 80 dB/mm; (2) a conductive quaternary compound with a melting point of about 80° C. to about 100° C. and an acoustic loss of about 15 to about 60 dB/mm; (3) a viscosity modifying compound that controls the viscosity of said ink, and possesses an acoustic loss of from about 5 to about 40 dB/mm; (4) a lightfastness component; (5) an antioxidant; and (6) a colorant, and which ink generates images with crease values of about 5 to about 10, haze values of about 10 to about 20, gloss values of about 75 to about 95, and which ink possesses an acoustic-loss value of from about 10 to about 80 dB/mm, and which ink possesses a viscosity of from about 1 centipoise to about 10 centipoise at a temperature of from about 125° C. to about 165° C.

15. An ink in accordance with claim 1 wherein the colorant is a pigment, or a dye present in an amount of from about 0.5 to about 20 percent by weight.

16. An ink in accordance with claim 1 wherein the colorant is a pigment of carbon black.

17. An ink in accordance with claim 1 wherein the colorant is a pigment of cyan, magenta, yellow, black, or mixtures thereof.

18. An ink in accordance with claim 1 wherein the acid salt is selected from diethyidithiocarbamic acid ammonium salt, diethyldithiocarbamic acid diethylammonium salt, and L-alanine ethyl ester hydrochloride; the quaternary compound is selected from the group consisting of dodecyl triphenylphosphonium bromide; 1,3-didecyl-2-2-methylimidazolium chloride; 1-ethyl-3-methyl-1-H-imidazolium chloride; and cetylpyridinium chloride monohydrate; the viscosity compound possesses a melting point of about 40° C. to about 140° C., an acoustic-loss value of from about 5 to about 40 dB/mm, and is selected from the group consisting of terthiophene, tetrabromo thiophene and 3-thiophene glyoxylic acid; the lightfastness component is present in an amount of from about 5 to about 1 percent by weight is selected from the group consisting of 2-dodecyl-N-(2,2,6,6tetramethyl-4-piperidinyl) succinimide, and [1,2, 2,6,6-pentamethyl-4-piperidinyl/β,β,β',β'-tetramethyl-3,9(2, 4,8,10-tetraoxo spiro (5,5) undecane)diethyl]-1,2,3,4-butane tetracarboxylate; said antioxidant is present in an amount of from about 5 to about 1 percent by weight, and is selected from tetra-sodium-N-(1,2-dicarboxyethyl)-N-octadecyl-sulfosuccinamate), and molybdenum oxysulfide dithio carbamate, and said colorant is present in an amount of from about 15 to about 1 percent by weight.

19. An ink in accordance with claim 1 with a conductivity of from about 6 to about 8, a viscosity of from about 1 centipoise to about 10 centipoise, and which ink provides images with crease values of about 5 to about 10, haze values of about 10 to about 15, and gloss values of about 85 to about 90.

20. An ink in accordance with claim 2 with a conductivity of from 6 to about 7.5, a viscosity of from about 1 centipoise to about 10 centipoise, and an acoustic loss of from about 10 to about 80 dB/mm, and which ink provides images with crease values of about 5 to about 10, haze values of about 10 to about 15, and gloss values of about 85 to about 90.

21. An ink composition comprised of (1) an acid salt with a melting point of from about 60° C. to about 120° C.; (2) a quaternary ammonium compound; (3) a thiophene compound; (4) a lightfastness compound; (5) a lightfast antioxidant; and (6) a colorant.

22. An ink in accordance with claim 21 wherein the colorant is a pigment.

23. An ink in accordance with claim 21 wherein the colorant is a dye.

24. An ink in accordance with claim 21 wherein the quaternary ammonium compound is dodecyltriphenylphosphonium bromide, 1,3-didecyl-2-2-methylimidazolium chloride, 1-ethyl-3-methyl-1-H-imidazolium chloride, or cetylpyridinium chloride monohydrate.

25. An ink in accordance with claim 21 and which ink is conductive.

26. An ink in accordance with claim 21 wherein said thiophene compound functions primarily as in ink viscosity controlling or modifying compound.

27. An ink in accordance with claim 21 which is substantially free of water.

28. An ink in accordance with claim 21 which contains no water.

29. An ink in accordance with claim 1 which is substantially free of water.

30. An ink in accordance with claim 1 which contains no water.

31. An ink comprised of an acid salt; a quaternary compound; a lightfastness compound; an antioxidant; and a colorant.

32. An ink in accordance with claim 31 which contains substantially no water, and which ink is conductive.

33. An ink in accordance with claim 1 wherein said lightfastness component is a UV absorber.

34. An ink composition consisting essentially of (1) an acid salt; (2) a quaternary compound; (3) a viscosity compound; (4) a lightfastness component; (5) a lightfastness antioxidant; and (6) a colorant.

35. An ink composition comprised of (1) an acid salt; (2) a quaternary compound; (3) a viscosity compound; (4) a lightfastness component; (5) a lightfastness antioxidant; and (6) a colorant, and wherein said salt is selected from the group consisting of (1) diethyldithiocarbamic acid ammonium salt; (2) diethyldithiocarbamic acid diethylammonium salt; (3) L-alanine ethyl ester hydrochloride; (4) DL-alanine ethyl ester hydrochloride; (5) ethyl 4-aminobutyrate hydrochloride; (6) 2-ethyl-2-thiopseudourea hydrobromide; (7) formamidine hydrochloride; and (8) N-methylhydroxylamine hydrochloride.

36. An ink composition comprised of (1) an acid salt; (2) a quaternary compound; (3) a viscosity compound; (4) a lightfastness component; (5) a lightfastness antioxidant; and (6) a colorant, and wherein said quaternary ammonium compound is selected from the group consisting of (1) azidotris (diethylamino) phosphonium bromide; (2) cetylpyridinium chloride monohydrate; (3) trimethylsulfonium methyl sulfate; (4) tetrakis(decyl) ammonium bromide; (5) tetraheptyl ammonium bromide; (6) tetrabutyl phosphonium chloride; (7) 3-ethyl-5-(2-hydroxyethyl)-4-methylthiazolium bromide; (8) (−)-N-dodecyl-N-methylepherdinium bromide; (9) 3,4-dimethyl-5-(2-hydroxyethyl)thiazolium iodide; (10) dodecyltriphenyl phosphonium bromide; (11) tetraoctylammonium bromide; (12) 1,3-didecyl-2-2-methylimidazolium chloride; and (13) 1-ethyl-3-methyl-1-H-imidazolium chloride.

37. An ink composition comprised of (1) an acid salt; (2) a quaternary compound; (3) a viscosity compound; (4) a lightfastness component; (5) a lightfastness antioxidant; and (6) a colorant, and wherein said viscosity compound is a thiophene selected from the group consisting of (1) 3-acetyl thiophene; (2) 2-acetyl-5-bromothiophene; (3) 2-acetyl-5-chlorothiophene; (4) 3-acetyl-2,5-dichloro thiophene; (5) tetrabromo thiophene; (6) 2-thiopheneacrylic acid; (7) 2-thiophene acetic acid; (8) 3-thiopheneacetic acid; (9) 2-thiophenecarboxylic acid; (10) 3-thiophenecarboxylic acid; (11) 3-thiophene glyoxylic acid; (12) 3-thiophene malonic acid; (13) 2-thiophene carboxylic hydrazide; (14) 2,3-thiophene dicarboxaldehyde; (15) 2,5-thiophene dicarboxaldehyde; (16) terthiophene; (17) 2-nitrothiophene; (18) 5-nitro-2-thiophene carboxaldehyde; (19) trans-2-(2-nitrovinyl) thiophene; and (20) 3-benzoylthiophene.

38. An ink composition comprised of (1) an acid salt; (2) a quaternary compound; (3) a viscosity compound; (4) a lightfastness component; (5) a lightfastness antioxidant; and (6) a colorant, and wherein said ink is substantially free of water in which ink possesses a conductivity of from about 6 to about 8, a viscosity of from about 1 centipoise to about 10 centipoise, and which ink provides images with crease values of about 5 to about 10, haze values of about 10 to about 15, and gloss values of about 85 to about 90.

39. An ink comprised of an acid salt, a quaternary compound, a lightfastness compound, an antioxidant, and a colorant, and wherein said ink contains substantially no water.

* * * * *